(12) United States Patent
Law et al.

(10) Patent No.: US 11,846,934 B2
(45) Date of Patent: Dec. 19, 2023

(54) INDUSTRIAL CONTROL SYSTEM HYPERCONVERGED ARCHITECTURE

(71) Applicant: FISHER-ROSEMOUNT SYSTEMS, INC., Round Rock, TX (US)

(72) Inventors: Gary K. Law, Georgetown, TX (US); Nina Golder, Round Rock, TX (US); Aaron Crews, Cedar Park, TX (US); Robert G. Halgren, III, Austin, TX (US); Claudio Fayad, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 98 days.

(21) Appl. No.: 16/579,320

(22) Filed: Sep. 23, 2019

(65) Prior Publication Data

US 2021/0089015 A1 Mar. 25, 2021

(51) Int. Cl.
*G05B 19/418* (2006.01)
*G05B 19/048* (2006.01)

(52) U.S. Cl.
CPC ..... *G05B 19/41885* (2013.01); *G05B 19/048* (2013.01); *G05B 2219/24058* (2013.01);
(Continued)

(58) Field of Classification Search
CPC ............ G05B 19/41885; G05B 19/048; G05B 2219/24058; G05B 2219/32345; G05B 2219/31018
See application file for complete search history.

(56) References Cited

U.S. PATENT DOCUMENTS 9,785,412 B1 * 10/2017 Huynh Van ............... G06F 8/24
9,864,727 B1 * 1/2018 Miller ................... G06F 15/177
(Continued)

FOREIGN PATENT DOCUMENTS

GB 2 536 750 A 9/2016
GB 2 536 810 A 9/2016
(Continued)

OTHER PUBLICATIONS

Skogestad, "Simple Analytic Rules for Model Reduction and Pid Controller Tuning." *Journal of Process Control*, 13:291-309 (2003).
(Continued)

*Primary Examiner* — Christopher E. Everett
*Assistant Examiner* — Yvonne Trang Follansbee
(74) *Attorney, Agent, or Firm* — MARSHALL, GERSTEIN & BORUN LLP

(57) ABSTRACT

A hyperconverged industrial process control architecture is disclosed for controlling an industrial process within a physical process environment using a software-defined distributed control system (DCS) environment. The software-defined DCS environment may be implemented by virtualizing the hardware components of a DCS architecture on a server group to enable both software-defined process controllers and back-end DCS applications to run within the server group. This software-defined DCS network architecture reduces the hardware requirements of the process control system and reduces configuration complexity by implementing control components and higher-level components within a common environment within the server group.

23 Claims, 5 Drawing Sheets

(52) U.S. Cl.
CPC .............. *G05B 2219/31018* (2013.01); *G05B 2219/32345* (2013.01)

(56) References Cited

U.S. PATENT DOCUMENTS

| | | | |
|---|---|---|---|
| 10,338,549 B2* | 7/2019 | Nixon | H04L 67/42 |
| 10,649,449 B2* | 5/2020 | Bell | G05B 23/024 |
| 2005/0256591 A1 | 11/2005 | Rule et al. | |
| 2007/0019641 A1* | 1/2007 | Pai | H04L 29/06 |
| | | | 370/389 |
| 2012/0095808 A1* | 4/2012 | Kattapuram | G05B 19/41885 |
| | | | 705/7.37 |
| 2012/0306620 A1* | 12/2012 | Karaffa | G05B 19/0423 |
| | | | 340/6.1 |
| 2016/0033952 A1* | 2/2016 | Schroeter | G05B 19/41885 |
| | | | 700/108 |
| 2017/0102693 A1* | 4/2017 | Kidd | G05B 19/41875 |
| 2017/0357247 A1 | 12/2017 | Krishnamurthy et al. | |
| 2019/0325093 A1* | 10/2019 | Schreder | G05B 19/41885 |

FOREIGN PATENT DOCUMENTS

| | | |
|---|---|---|
| WO | WO-00/36479 A1 | 6/2000 |
| WO | WO-2015/048384 A1 | 9/2016 |

OTHER PUBLICATIONS

Search Report for Application No. GB2014107.3, dated Feb. 5, 2021.

* cited by examiner

INDUSTRIAL CONTROL SYSTEM HYPERCONVERGED ARCHITECTURE

TECHNICAL FIELD

This patent application relates generally to industrial and process control systems and, more particularly, to an industrial control system that provides run-time process control using a software-defined architecture.

BACKGROUND

Process or industrial control systems, like those used in chemical, petroleum or other industrial process plants to produce physical products from materials, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc., to control one or more processes executing within the process plant or system. Smart field devices, such as the field devices conforming to the well-known FOUNDATION® Fieldbus protocol may also perform control calculations, alarming functions, and other control functions commonly implemented within the controller. The process controllers, which may be located within the plant environment in a distributed manner, receive signals indicative of process measurements made by the field devices and/or other information pertaining to the field devices and execute a controller application that runs, for example, different control modules that make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available from the controllers over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices execute applications that may, for example, enable an engineer to configure portions of the process or an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and to download these process control modules via a data highway to dedicated distributed controllers. Typically, these control modules are made up of communicatively interconnected function blocks, which are objects in an object-oriented programming protocol that perform functions within the control scheme based on inputs thereto and that provide outputs to other function blocks within the control scheme. The configuration application may also allow a configuration designer to create or change operator interfaces that are used by a viewing application to display data to an operator and to enable the operator to change settings, such as setpoints, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

The architecture of currently known process control plants and process control systems is strongly influenced by limited controller and device memory, communications bandwidth, and controller and device processor capability. For example, in currently known process control system architectures, the use of dynamic and static non-volatile memory in the controllers is usually minimized or, at the least, managed carefully. As a result, during system configuration (e.g., a priori), a user or configuration engineer typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Additionally, to minimize controller memory usage in currently known process control systems, selected data that is to be archived or saved (as indicated by the configuration of the controller) is reported to the workstation or computing device for storage at an appropriate data historian or data silo. The current techniques used to report the data poorly utilizes communication resources and induces excessive controller loading. Additionally, due to the time delays in communication and sampling at the historian or silo, the data collection and time stamping is often out of sync with the actual process.

Similarly, in batch process control systems, to minimize controller memory usage, batch recipes and snapshots of controller configuration typically remain stored at a centralized administrative computing device or location (e.g., at a data silo or historian), and are only transferred to a controller when needed. Such a strategy introduces significant burst loads in the controller and in communications between the workstation or centralized administrative computing device and the controllers.

Further, the current architecture of industrial control systems, such as process control systems, is largely hardware driven in that various functions, such as control functions, input/output (I/O) functions, user interface functions, etc. are performed in and are tied to specific pieces of hardware (e.g., user workstations or interface devices, process controllers, safety system controllers, dedicated I/O devices, marshalled I/O devices, field devices, safety logic solvers, etc.) and remain stored in the specific hardware at all times. For example, in current process control systems, interconnections between controllers and I/O devices (e.g., either individual I/O devices, or banks of marshalled I/O devices) are configured based on particular hardware, and consequently, physical I/O relationships are tightly bound, most commonly in a one-to-one manner (e.g., I/O device to controller, another I/O device to another controller, etc.). This architectural design limits the resiliency, reliability, availability, responsiveness, and the elasticity of the control system, as these systems are difficult to change or reconfigure quickly, are tightly tied to proprietary hardware used to implement proprietary control software, require hardware redundancy on a device-by-device basis that can be expensive to implement, and are not easily scalable or able to be upgraded without adding additional hardware that needs to be configured in particular manners (e.g., due to size limitations of individual devices such as physical process controllers, or particular characteristics and capabilities of I/O devices).

Moreover, current control system architecture separates the online process control applications and other related applications into a plurality of function-specific devices communicating via a process plant communication network. Thus, process control systems require additional hardware devices, which must be separately configured to communicate with other devices with they interact. For example, replacing or reconfiguring a field device within the process plant may necessitate reconfiguration of multiple controllers that interact with the field device, as well as multiple workstations and higher-level applications that monitor data associated with such field device.

SUMMARY

A hyperconverged distributed control system (DCS) architecture for industrial process control is described herein that implements software-defined process controllers and related applications in a combined software-defined DCS environment. The software-defined DCS environment may virtualize the hardware components of a DCS architecture within a software-defined virtual network operating on standard hardware components, allowing such components to be managed as software components. Such software-defined DCS environment may be implemented within a server group, such as a privately-hosted cloud computing system, which reduces both hardware requirements of the system and configuration required to set up the system. Systems, methods, and computer-readable media storing executable instructions for controlling an industrial process within a physical process environment are described herein. Such systems, methods, and instructions may include or be implemented by a server group configured to implement a software-defined DCS environment comprising: one or more software-defined process controllers configured to control at least a portion of the industrial process in real time by communication with a plurality of field devices within the physical process environment and one or more DCS applications configured to interact with the software-defined process controllers.

The server group includes a plurality of server devices operation together to implement the software-defined DCS environment. In some embodiments, the server group is communicatively connected to the plurality of field devices via one or more input/output (I/O) connections configured to communicate process data over a process control network using an industrial process control communication protocol. In further embodiments, the software-defined DCS environment further comprises one or more virtual networking components configured to replicate one or more of the following physical network components: network switches, routers, or firewalls.

In some embodiments, at least one of the DCS applications is configured to adjust operation of the software-defined process controllers. In further embodiments, the DCS applications may provide various functionalities within the software-defined DCS environment. The DCS applications may include a virtual architecture configuration application having a user interface configured to enable a user to define a virtual DCS network architecture by specifying a plurality of virtual nodes within the virtual DCS network architecture and connections between the virtual nodes. Such virtual nodes may include virtual representations of the plurality of field devices. Additionally or alternatively, the DCS applications may further include a data historian application configured to store process data within the software-defined DCS environment automatically during operation of the industrial process. In still further embodiments, the DCS applications may include one or more of the following functionalities: an operator interface, an engineering workstation, an asset management system, a manufacturing executing system, or an advanced process control system. In yet further embodiments, the DCS applications may include a network gateway to communicate with external data networks.

In further embodiments, the server group may be configured to provide load balancing or redundancy using the plurality of server devices. In such embodiments, the one or more software-defined process controllers include a plurality of instances of virtual DCS controllers running simultaneously on different server devices of the server group. The server group may thus be configured to perform automatic load balancing between the plurality of instances of the virtual DCS controllers based upon the statuses of the plurality of server devices in the server group. In additional embodiments, the DCS applications may include an application configured to predict an optimal number of server devices of the server group based upon resource usage of the server group and resource availability of the plurality of server devices.

According to an aspect of the systems, methods, and computer-readable media storing executable instructions for controlling an industrial process within a physical process environment described herein, techniques for controlling an industrial process within a physical process environment may comprise: (i) connecting a plurality of field devices within the physical process environment to a server group comprising a plurality of server devices configured to implement a software-defined DCS environment via one or more I/O connections; (ii) controlling at least a portion of the industrial process in real time by communication with the plurality of field devices within the physical process environment by one or more software-defined process controllers running in the software-defined DCS environment on the server group; and (iii) adjusting operation of the one or more software-defined process controllers by one or more DCS applications running in the software-defined DCS environment on the server group and configured to interact with the software-defined process controllers.

The server group may receive process data from the plurality of field devices via the one or more I/O connections and send process control signals to the plurality of field devices to control the portion of the industrial process via the one or more I/O connections. In some embodiments, the DCS applications may detect a type of process data associated with a field device of the plurality of field devices based upon data traffic at the one or more I/O connections and determine an adjustment to the operation of the one or more software-defined process controllers based upon the type of the process data. In further embodiments, the DCS applications may provide load balancing by detecting a change to a status of one of the plurality of server devices of the server group and adjusting a load distribution between the plurality of server devices based upon the change to the status. In some such embodiments, redundancy of the software-defined process controllers may also be provided by simultaneously implementing a plurality of instances of virtual DCS controllers on different server devices of the server group, such that control may be transferred between the instances in the event of a failure of control by one of the server devices.

In some embodiments, the DCS applications may include a virtual architecture configuration application that generates user interface for a user that includes a plurality of options to configure virtual components within the software-defined DCS environment and receives user input from the user to define a virtual DCS network architecture by specifying a plurality of virtual nodes within the virtual DCS network architecture and connections between the virtual nodes. Such virtual nodes may include the one or more virtual representations of the plurality of field devices. In further embodiments, the DCS applications may include a data historian that monitors process data within the software-defined DCS environment automatically during operation of the industrial process and automatically stores the process data in a datastore associated with the server group.

DETAILED DESCRIPTION

The hyperconverged industrial process control system architecture described herein provides a software-defined distributed control system (DCS) architecture for controlling industrial processes within physical process plants. Such software-defined DCS architecture provides a hardware-independent and extensible control network by pooling resources within the process control system in a manner that allows components to be defined, managed, and controlled as software components. For example, a software-defined DCS architecture enables implementation of software-defined process controllers and back-end DCS applications on the same hardware, such as a server group forming a private cloud computing network. This combination of the controllers and higher-level applications within a software-defined DCS environment has numerous advantages. For example, this architecture allows standard server hardware to be used, rather than system-specific hardware for process controllers, thus enabling scalability in the process control system through the addition or removal of servers within a server group. Additionally, implementing virtual representations of multiple DCS process controllers in the server group (together with other DCS applications) eliminates the need for separate hardware for each controller and other back-end system. Moreover, the software-defined combination of the software-defined process controllers and DCS applications within the server group eliminates the need to route process data to multiple controllers, thereby reducing the complexity of the control system and reducing the effort required to configure or update the system architecture. Load balancing and failover functionality are also improved by implementing the software-defined process controllers as virtual DCS controllers in a server group, such that redundant virtual DCS controllers may be implemented in the various servers of the server group in a resource-efficient manner. These advantages are exemplary only, and additional advantages to the software-defined DCS architecture described herein will be apparent to those of skill in the art based upon the following disclosure.

Physical Process Plant and Process Control Systems

Figure 1:
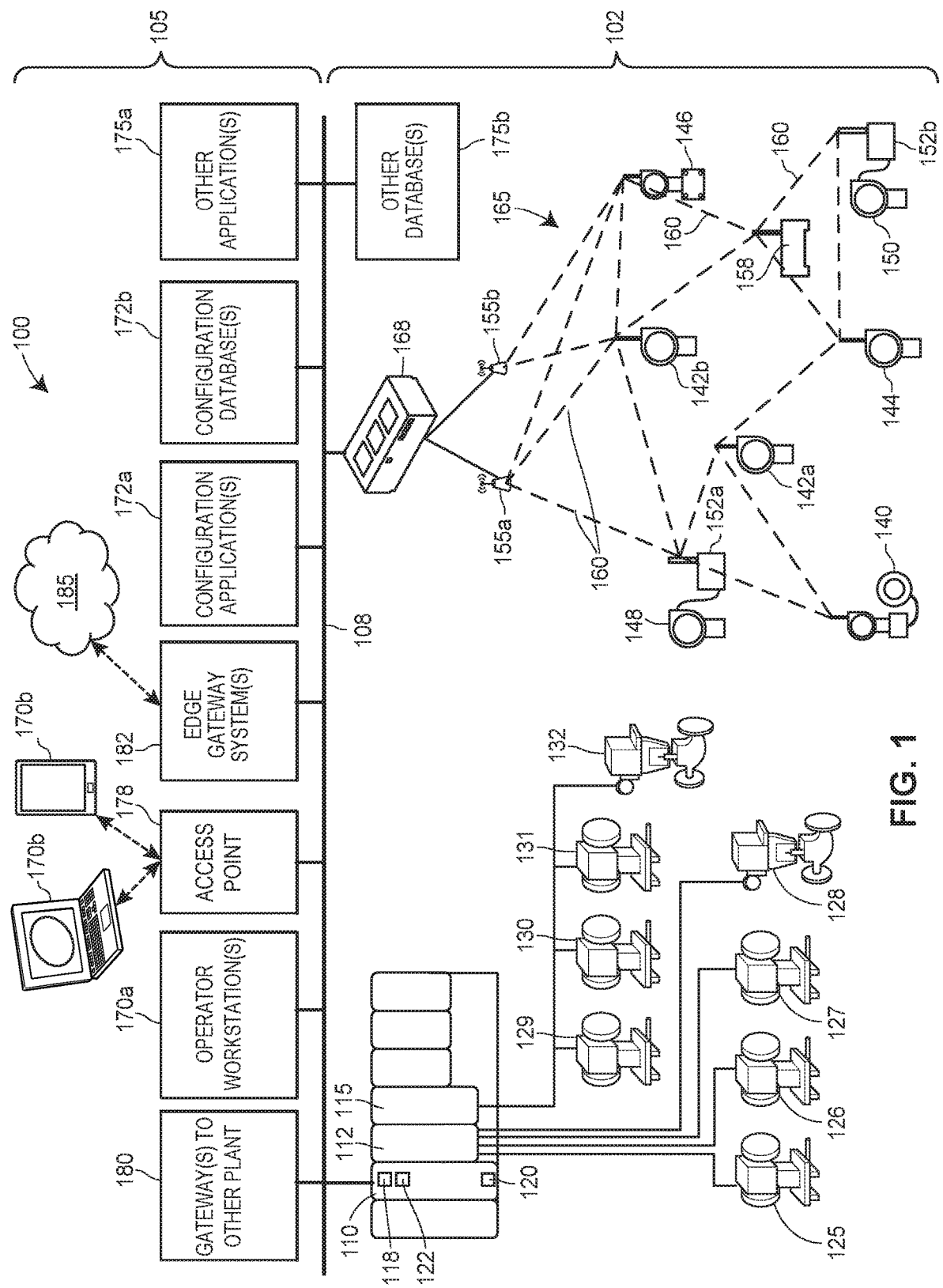
FIG. 1 illustrates a block diagram of an example physical process plant environment in which a distributed control system (DCS) controls at least a portion of a process in an industrial or process plant.

FIG. 1 is a block diagram of an example physical process plant 100 environment in which a distributed control system (DCS) controls at least a portion of a process in an industrial or process plant. The DCS system of the physical process plant 100 controls an industrial process (or, in some embodiments, operates in conjunction with a virtual plant environment to control the industrial process), where the industrial process may be said to have one or more "process outputs" characterizing the state of the process (e.g., tank levels, flow rates, material temperatures, etc.) and one or more "process inputs" (e.g., the state of various environmental conditions and actuators, the manipulation of which may cause process outputs to change). The physical process plant 100 includes a field environment 102 and a back-end environment 105, each of which is communicatively connected to the other by a process control backbone or data highway 108, which may include one or more wired and/or wireless communication links and/or networks, and may be implemented using any desired or suitable communication protocol such as, for example, an Ethernet protocol, an IP protocol, or another packet protocol.

At a high level, the field environment 102 includes physical components (e.g., process control devices, networks, network elements, etc.) that are installed and interconnected to operate in combination to control the industrial process during run-time. By and large, these physical components are located, disposed, or otherwise included in the field environment 102 of the physical process plant 100 in which raw materials are received and processed using the physical components disposed therein to thereby generate one or more physical products (e.g., paper, refined oil, pharmaceuticals, etc.). By contrast, the back-end environment 105 of the physical process plant 100 includes various physical components such as computing devices, operator workstations, databases or databanks, etc. that are shielded and/or protected from the harsh conditions and materials of the field environment 102. In some configurations, various computing devices, databases, and other components and equipment included in the back-end environment 105 of the physical process plant 100 may be physically located at different physical locations, some of which may be local to the physical process plant 100, and some of which may be remote.

The Field Environment 102 of the Physical Process Plant 100

As illustrated in FIG. 1, the field environment 102 includes one or more process controllers 110 that are communicatively connected to a data highway 108. Each of the process controllers 110 may be connected to one or more intermediary nodes, such as I/O devices 112, 115 (e.g., I/O cards, I/O devices, I/O systems, etc.) facilitating communication between the controllers 110 and the field devices. Generally speaking, in the process control industry, the term "I/O" is sometimes used in a number of related but different contexts. The term generally refers to a logical link or communication channel that communicatively couples a field device to an I/O card or controller (e.g., "I/O channel"), but may be used when referring to a number of other concepts, such as the physical devices that are utilized to transmit signals to or receive signals from field devices via I/O channels (e.g., "I/O devices" or "I/O cards") and connectors or terminals associated with the I/O devices (e.g., "I/O connectors"). I/O devices and I/O cards 112, 115 may be stand-alone, individual physical devices each of which is connected to a respective controller and to one or more respective field devices, as illustrated. In some arrangements (not shown in FIG. 1), I/O devices, cards, connectors, and other I/O-related components such as terminal blocks, modules, processors, etc. are included in an I/O electronic marshalling system that enables flexible I/O delivery between multiple controllers and multiple field devices of various types, such as described in U.S. Pat. Nos. 7,684,875; 8,332,567; 8,762,618; 8,977,851; 9,083,548; 9,411,769; 9,495,313; and 9,946,240, the entire contents of which are expressly incorporated by reference herein. As such, for clarity of discussion and as utilized herein, the term "I/O devices" generally includes physical I/O devices, cards, electronic marshalling systems, and components thereof via which I/O channels are implemented to thereby communicatively couple field devices and controllers. Additionally, the term "I/O connections" generally refers to physical I/O devices and other physical components that connect various components to communicate I/O data between such components.

In the process control industry, the term "I/O" generally may be used to refer to the signals transmitted on an I/O channel (e.g., "I/O signals"), variables or commands represented by the signals (e.g., "I/O parameters"), or to the values of the variables or commands carried by the signals (e.g., "I/O parameter values" or "I/O data payload"). Accordingly, for clarity of discussion and as utilized herein, I/O signals, I/O parameters, and I/O parameter values are collectively and generally referred to herein as "I/O data" or "process I/O data."

To the extent the term "I/O" is referenced herein without a qualifier, the context of the sentence should make clear which of these concepts is being discussed. Further, it should be understood that an "I/O channel" represents a particular type of "communication channel" or "channel." That is, unless the context of the sentence suggests otherwise, references in this description to the term "channel" or the term "communication channel," without the qualifier "I/O," may refer to a communication link that could be an I/O channel in some implementations, but may also refer to a communication link other than an I/O channel in some implementations.

Using process I/O data, each process controller 110 of the physical process plant 100 implements a control strategy defined by one or more control routines (e.g., one or more component behavior modules), which may be stored in a memory of the controller 110. When a processor of the controller executes one or more of the control routines, the controller transmits to one or more field devices a control signal (i.e., a "control output") over wired or wireless process control communication links or networks to control the operation of a process in the plant 100. The controller may generate a control signal based on: (i) one or more received signals, which may be referred to as "control inputs" (e.g., one or more received signals representing measurements obtained by field devices), and (ii) the logic of the one or more control routines, which may be defined by one or more software elements (e.g., function blocks). Typically, a controller manipulates a process input (which may be referred to as a "manipulated variable") to change a particular process output (which may be referred to as a "controlled variable" or simply a "process variable") based on feedback (i.e., a measurement of the controlled variable) and a desired value for the process output (i.e., a setpoint).

Generally, at least one field device performs a physical function (e.g., opening or closing a valve, increasing or decreasing a temperature, taking a measurement, sensing a condition, etc.) to control the operation of a process implemented in the physical process plant 100. Some types of field devices communicate with controllers by using I/O devices. Process controllers, field devices, and I/O devices may be wired or wireless, and any number and combination of wired and wireless process controllers, field devices, I/O devices may be included in the physical process plant 100.

For example, FIG. 1 illustrates a process controller 110 that is communicatively connected to wired field devices 125-132 via input/output (I/O) devices 112 and 115, and that is communicatively connected to wireless field devices 140-146 via a wireless gateway 168 and the data highway 108. In some configurations (not shown), the controller 110 may be communicatively connected to the wireless gateway 168 using one or more communications networks other than the data highway 108, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 110, which may be, by way of example, the DeltaV™ controller sold by Emerson Process Management, may operate to implement a batch industrial process or a continuous industrial process using at least some of the field devices 125-132 and 140-146. In an embodiment, in addition to being communicatively connected to the process control data highway 108, the controller 110 is also communicatively connected to at least some of the field devices 125-132 and 140-146 using any desired hardware and software associated with, for example, standard 4-20 mA devices, I/O devices 112, 115, and/or any smart communication protocol such as the FOUNDATION® Fieldbus protocol, the HART® protocol, the WirelessHART® protocol, etc. As illustrated, the controller 110, the field devices 125-132, and the I/O devices 112, 115 are wired devices, and the field devices 140-146 are wireless field devices. Of course, the wired field devices 125-132 and wireless field devices 140-146 could conform to any other desired standard(s) or protocols, such as any wired or wireless protocols, including any standards or protocols developed in the future.

The process controller 110 includes a processor 120 that implements or oversees one or more process control routines 118 (e.g., executes computer-readable instructions of process control routines 118 stored in a memory 122 of the controller 110). The processor 120 is configured to communicate with the field devices 125-132 and 140-146 and with other nodes communicatively connected to the controller 110. It should be noted that any control routines or modules described herein may have parts thereof implemented or executed by different controllers, processors, or other devices if so desired. Likewise, the control routines or modules 118 described herein which are to be implemented within the physical process plant 100 may take any form, including software, firmware, hardware, etc. Control routines may be implemented in any desired software format, such as using object oriented programming, ladder logic, sequential function charts, function block diagrams, or using any other software programming language or design paradigm. The control routines 118 may be stored in any desired type of memory 122, such as random access memory (RAM), or read only memory (ROM). Likewise, the control routines 118 may be hard-coded into, for example, one or more EPROMs, EEPROMs, application specific integrated circuits (ASICs), or any other hardware or firmware elements. Thus, the controller 110 may be configured to implement a control strategy or control routine in any desired manner.

The controller 110 implements a control strategy using what are commonly referred to as function blocks, where each function block is an object or other part (e.g., a subroutine) of an overall control routine and operates in conjunction with other function blocks (via communications called links) to implement process control loops within a process control system. Control-based function blocks typically perform one of: (i) an input function, such as that associated with a transmitter, a sensor or other process parameter measurement device (sometimes referred to as "input blocks"); (ii) a control function, such as that associated with a control routine that performs PID, fuzzy logic, etc. (sometimes referred to as "control blocks"); or (iii) an output function which controls the operation of some device, such as a valve, to perform some physical function within the physical process plant 100 (sometimes referred to as "output blocks"). Of course, hybrid and other types of function blocks exist.

Function blocks may be stored in and executed by the controller 110, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. One or more of the control routines 118 may implement one or more control loops which are performed by executing one or more of the function blocks. In a sense, the control routines 118 may be viewed as the component behavior modules of the controller 110.

The wired field devices 125-132 may be any types of devices, such as sensors, valves, transmitters, positioners, etc., while the I/O devices 112 and 115 may be any types of process control I/O devices conforming to any desired communication or controller protocol. For example, the I/O devices 112, 115 may be included in an I/O electronic marshalling system. For example, the field devices 125-128 may be standard 4-20 mA devices or HART® devices that communicate over analog lines or combined analog and digital lines to the I/O device 112, while the field devices 129-132 may be smart devices, such as FOUNDATION® Fieldbus field devices, that communicate over a digital bus to the I/O device 115 using a FOUNDATION® Fieldbus communications protocol. In some embodiments, though, at least some of the wired field devices 125, 126 and 128-131 and/or at least some of the I/O devices 112, 115 additionally or alternatively communicate with the controller 110 using the process control data highway 108 and/or by using other suitable industrial process control communication protocols (e.g., Profibus, DeviceNet, Foundation Fieldbus, ControlNet, Modbus, HART, etc.). In some arrangements (not shown in FIG. 3), at least some of the field devices 125-132 may communicate with the controller 110 via an electronic I/O marshalling system instead of via an individual I/O device 112, 115.

The wireless field devices 140-146 communicate via a wireless process control communication network 165 using a wireless protocol, such as the WirelessHART® protocol. Such wireless field devices 140-146 may directly communicate with one or more other devices or nodes of the wireless network 165 that are also configured to communicate wirelessly (using the wireless protocol or another wireless protocol, for example). To communicate with one or more other nodes that are not configured to communicate wirelessly, the wireless field devices 140-146 may utilize a wireless gateway 168 connected to the process control data highway 108 or to another process control communications network. The wireless gateway 168 provides access to various wireless devices 140-158 of the wireless communications network 165. In particular, the wireless gateway 168 provides communicative coupling between the wireless devices 140-158, the wired devices 125-132, and/or other nodes or devices of the physical process plant 100. For example, the wireless gateway 168 may provide communicative coupling by using the process control data highway 108 and/or by using one or more other communications networks of the physical process plant 100.

Similar to the wired field devices 125-132, the wireless field devices 140-146 of the wireless network 165 perform physical control functions within the physical process plant 100, e.g., opening or closing valves, or taking measurements of process parameters. The wireless field devices 140-146, however, are configured to communicate using the wireless protocol of the network 165. As such, the wireless field devices 140-146, the wireless gateway 168, and other wireless nodes 152-158 of the wireless network 165 are producers and consumers of wireless communication packets.

In some configurations of the physical process plant 100, the wireless network 165 includes non-wireless devices. For example, in FIG. 1, a field device 148 is a legacy 4-20 mA device and a field device 150 is a wired HART® device. To communicate within the network 165, the field devices 148 and 150 are connected to the wireless communications network 165 via a wireless adaptor 152a, 152b. The wireless adaptors 152a, 152b support a wireless protocol, such as WirelessHART, and may also support one or more other communication protocols such as Foundation® Fieldbus, PROFIBUS, DeviceNet, etc. Additionally, in some configurations, the wireless network 165 includes one or more network access points 155a, 155b, which may be separate physical devices in wired communication with the wireless gateway 168 or may be provided with the wireless gateway 168 as an integral device. The wireless network 165 may also include one or more routers 58 to forward packets from one wireless device to another wireless device within the wireless communications network 165. Thus, the wireless devices 140-146 and 152-158 communicate with each other and with the wireless gateway 168 over wireless links 160 of the wireless communications network 165, and/or via the process control data highway 108.

It is noted that although FIG. 1 only illustrates a single controller 110 with a finite number of field devices 125-132 and 140-146, wireless gateways 168, wireless adaptors 152, access points 155, routers 158, and wireless process control communications networks 165 included in the example physical process plant 100, this is only an illustrative and non-limiting embodiment. Any number of controllers 110 may be included in the physical process plant 100, and any of the controllers 110 may communicate with any number of wired or wireless devices and networks 125-132, 140-146, 168, 152, 155, 158 and 165 to control a process in the physical process plant 100.

The Back-End Environment 105 of the Physical Process Plant 100

As noted above, the back-end environment 105 may include various components such as computing devices, operator workstations, databases or databanks, etc. that are typically shielded and/or protected from the harsh conditions and materials of the field environment 102. For example, the back-end environment 105 may include any one or more of the following, each of which may be communicatively connected to the data highway 108: (i) one or more operator workstations 170a and/or other local or remote user interface devices 170b; (ii) one or more configuration applications 172a and/or configuration databases 172b; (iii) one or more other types of applications 175a and/or databases 175b, which may include, for example, tools, diagnostics, asset management systems, simulators, and/or other types of applications; (iv) one or more other wireless access points 178 that communicate with other devices associated with plant 100 (e.g., user interface devices 170b or other devices) using various wireless protocols; (v) one or more plant gateway systems 180 to other plants; (vi) one or more edge gateway systems 182 to systems or other networks 185 that are external to the immediate, operations technology layers of the physical process plant 100 (e.g., IT networks/systems of the enterprise, and/or external data networks/systems, which may be implemented on cloud computing and/or other suitable platforms); and/or (vii) other physical components that are specially configured via hardware and software to support the process plant 100.

The operator workstations 170a and other user interface devices 170b may be utilized by operators to view and monitor run-time operations of the physical process plant 100, as well as to take any diagnostic, corrective, maintenance, and/or other actions that may be required. At least some of the operator workstations 170a may be located at various, protected areas in or near the plant 100, and in some situations, at least some of the user interface devices 170b may be remotely located, but nonetheless in communicative connection with the plant 100. Operator workstations and user interface devices 170a, 170b may be wired or wireless computing devices configured to implement operator interface programs or applications to enable operators to monitor and control operation of the physical process plant 100.

The configuration applications 172a and the configuration databases 172b may be utilized to configure certain aspects of control and/or communication for the physical process plant 100, such as by initial configuration and reconfiguration of control modules/routines, user interfaces, data monitoring/analytics, etc. For example, various instances of the configuration application 172a may execute on one or more computing devices (not shown) to enable users to create or change process control modules and download these modules via the data highway 108 to the controllers 110, to create or change operator interfaces via which an operator is able to view data and change data settings within process control routines, to create or change data monitoring/analytics routines and functions which may be downloaded into various physical components within the field environment 102, etc. The configuration databases 172b store the created (e.g., configured) modules, operator interfaces, data monitoring/analytics, etc. Generally, the configuration applications 172a and configuration databases 172b are centralized and have a unitary logical appearance for a DCS environment (e.g., the DeltaV™ control system sold by Emerson Process Management) for the physical process plant 100, although multiple instances of the configuration applications 172a may execute simultaneously within the DCS environment, and the configuration databases 172b may be implemented across multiple physical data storage devices. Accordingly, the configuration applications 172a and the configuration databases 172b (including their user interfaces) comprise a configuration or development system 172 for various types of modules, e.g., control modules, display or operator interface modules, and/or analytics modules. Typically, but not necessarily, the user interfaces for the configuration system 172 are different than the operator workstations/user interface devices 170, as the user interfaces for the configuration system 172 are utilized by configuration and development engineers irrespective of whether or not the physical process plant 100 is operating in production mode, whereas the operator workstations/user interface devices 170 are utilized by operators during run-time operations of the physical process plant 100.

Regarding commissioning of the physical components of the field environment 102, the configuration database 172b may store data and other information that specifically identifies and/or addresses the various physical devices or components and their interconnections that are planned for or desired to be implemented on the process plant floor or field environment 102. Some of this commissioning data may be provided to components in the field environment 102 for use in commissioning of devices and loops therein, and some of this data may be utilized in the back-end environment 105, e.g., for the design, development, and preparation of control modules, operator interface modules, and/or data analytics modules that will operate in conjunction with the field environment 102 during live operations of the physical process plant 100. In an example, an approved control module is downloaded from the configuration database 172*b* into a process controller 110 so that, when executed during live operations, the process controller 110 operates in accordance with its resident control module to send and receive various signals to/from other components in its loop (and, in some cases, to/from other process controllers), thereby controlling at least a portion of the process in the physical process plant 100.

The configuration database 172*b* may store a number of logical identifiers of components in the field environment 102, enabling the controller 110 and other devices to reference the components and signals associated with the components by way of the logical identifiers. For example, for a given field device, the configuration database 172*b* may store information mapping or binding a logical identifier to a particular hardware address or I/O channel. The hardware address may identify a particular controller, a particular I/O device connected to the particular controller, and/or a particular address for the I/O channel connecting the particular I/O device to the field device. In some instances, this mapping or binding may be stored at the controller 110, the user interface device 170*b*, the operator workstation 170*a*, or any other desired device (e.g., any device needing to resolve the logical identifier). After a logical identifier has been bound to a hardware address or I/O channel, the identifier is considered "assigned." In some cases, the physical process plant 100 includes "unassigned" logical identifiers, which are identifiers that a software element (e.g., a control routine and/or a function block) references but that has no binding. That is, a logical identifier is considered "unassigned" when the plant 100 and the configuration database 172*b* have no hardware address or I/O channel that has been bound to the tag. Thus, when an unassigned logical identifier is referenced by a control routine, no value carried by a signal in the physical process plant 100 will be read and no command will be transmitted via a signal to a field device in the physical process plant 100.

Examples of such logical identifiers include device tags (DTs), each of which represents a particular instrument, controller, valve, or other physical field device, and device signal tags (DSTs), each of which represents a particular signal that is received or generated by a particular device and that typically corresponds to a particular parameter utilized by the field device. For some devices, a DST comprises a combination of a device's DT and an identifier of a specific signal received or generated by that device, e.g., an identifier of a specific parameter referenced by a control module. For some devices, such as legacy or dumb devices, a DT represents both the physical device and a signal generated by the device. Generally speaking, a device's logical identifier is used by the physical process plant 100 in both the field environment 102 and in the back-end environment 105 to uniquely identify the device. The DTs and DSTs may be referred to as "tags," "system tags," or "system identifiers."

In some instances, the smart field devices 129-132 also may store logical identifiers unique to the smart field devices 129-132. These logical identifiers may be distinct from the system tags utilized by the plant 100 to identify the field devices 129-132, and may be referred to as "source identifiers" or "source tags." Source tags may or may not be stored at the configuration database 172*b*, depending on the implementation. The configuration database 172*b* may store data and other information that specifically identifies and/or addresses various virtual devices or components (e.g., various virtual nodes) that are planned for or desired to be implemented in a virtual DCS environment, as described below. Similar to physical devices and components, the configuration database 172*b* may store respective logical identifiers of components of the virtual DCS environment, thereby enabling other devices and/or components (whether physical or virtual) to reference the virtual components. For example, similar to physical nodes within the field environment 102, various virtual nodes may be uniquely identified within the DCS environment operating in the back-end environment 105 via their respective device tags (DTs), devices signal tags (DSTs), source tags, and/or other types of unique identifiers. Further sections of this disclosure discuss the configuring and identification of virtual devices and components in more detail.

The other applications 175*a* and databases 175*b* may include instances of applications that are used to monitor or analyze aspects of operation of the physical process plant 100, such as diagnostic applications/databases, data historian applications/databases, system level health monitoring applications/databases, local and/or remote user interfaces, etc. Generally speaking, the other applications 175*a* and databases 175*b* may include one or more applications executing at the operations technology layers of the physical process plant 100 and their associated databases. Additionally or alternatively, the other applications 175*a* and databases 175*b* may include one or more applications executing at the IT layers associated with the process plant 100, such as inventory management applications, personnel management applications, supply chain management applications, other types of enterprise-related applications, weather/environmental applications, etc., and their associated databases. For example, the other applications 175*a* and databases 175*b* may include Internet of Things (IoT) and/or Industrial Internet of Things (IIoT) applications and their associated databases. Still further additionally or alternatively, the other applications 175*a* and databases 175*b* may include one or more applications that are external to and/or that execute remotely from the physical process plant 100 and/or its enterprise, such as simulation applications, analytics applications, etc., and their associated databases. The other applications 175*a* and databases 175*b* may include third-party applications and/or may include applications provided by the enterprise associated with the physical process plant 100. At least some of the other applications 175*a* and databases 175*b* may be accessed via an edge gateway system 182 and/or some other type of security and/or firewall system.

The one or more access points 178 enable devices in the back-end environment 105 (and sometimes in the field environment 102) to communicate with other devices using wired or wireless communication protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radio communication Sector) compatible protocols, short-wavelength radio communications such as near field communications (NFC) and Bluetooth, or other wireless communication protocols. Typically, such access points 178 allow handheld or other portable computing devices (e.g., user interface devices 170*b*) to communicate over a respective wireless process control communication network that is different from the wireless network 165 and that supports a different wireless protocol than the wireless network 165. For example, a wireless or portable user interface device 170*b* may be a mobile workstation or diagnostic test equipment that is utilized by an operator within the physical process plant 100 (e.g., an instance of one of the operator workstations 170a). In some scenarios, in addition to portable computing devices, one or more process control devices (e.g., controller 110, field devices 125-132, or wireless devices 168, 140-158) also communicate using the wireless protocol supported by the access points 174.

The gateway nodes or systems 180 and 182 may interface with systems that are external to the immediate physical process plant 100. Typically, such systems are customers or suppliers of information generated by or operated on by the physical process plant 100. For example, the physical process plant 100 may include a plant gateway node 180 to communicatively connect the immediate physical process plant 100 with another process plant. Additionally or alternatively, the physical process plant 100 may include an edge gateway node or system 182 to communicatively connect the physical process plant 100 with an external public or private system, such as a laboratory system (e.g., Laboratory Information Management System or LIMS), an operator rounds database, a data consolidation and viewing system, a data analytics system, a materials handling system, an asset management system, a maintenance management system, a product inventory control system, a production scheduling system, a weather data system, a shipping and handling system, a packaging system, the Internet, an IOT application, an IIOT application, or other external systems.

Generally speaking, the edge gateway system 182 allows communications to be securely delivered between the physical process plant 100 and other networks 185. In an example architecture, an edge gateway system 182 includes an internal-facing or plant-facing engine (which may be referred to as a "field gateway") and an external-facing or outwards-facing engine (which may be referred to as an "edge gateway"), where the plant-facing engine and the external-facing engine cooperate to securely deliver process plant data (e.g., data generated by the operations technology layers) to external networks and/or applications (e.g., IT layers and/or external networks and/or systems) that are consumers of the plant data. In one of many embodiments, the plant-facing engine collects data generated by various components of the process plant 100, and securely transmits the collected data across one or more secured communication links to the external-facing engine, e.g., via a first set of publications. The external-facing engine has subscribed to various publications generated by the plant-facing engine and obtains the collected plant data therefrom. In turn, the external-facing engine securely transmits the obtained plant data to one or more external client applications within the networks 185, e.g., via a second set of publications. Publications and subscriptions at the plant-facing engine and/or at the external-facing engine may be respectively configured as desired. Typically, though, the publication/subscription, encryption, and/or other secure data delivery mechanisms that are utilized between the plant-facing engine and the external-facing engine differ from the publication/subscription, encryption, and/or other secure data delivery mechanism that are utilized between the external-facing engine and external applications. In some embodiments, for additional security, the edge gateway system 182 includes a one-way data diode disposed between the plant-facing engine and the external-facing engine to prevent data from flowing from external networks 185 into the process plant 100. Examples of edge gateway systems may be found in U.S. Patent Publications No. 2018/0115516; 2018/0115528; 2018/0115517; and 2018/0113442, the entire disclosures of which are hereby incorporated by reference. Of course, other edge gateway systems may be additionally or alternatively utilized by the physical process plant 100.

Software-Defined DCS Environment for a Physical Process Plant

Figure 2A:
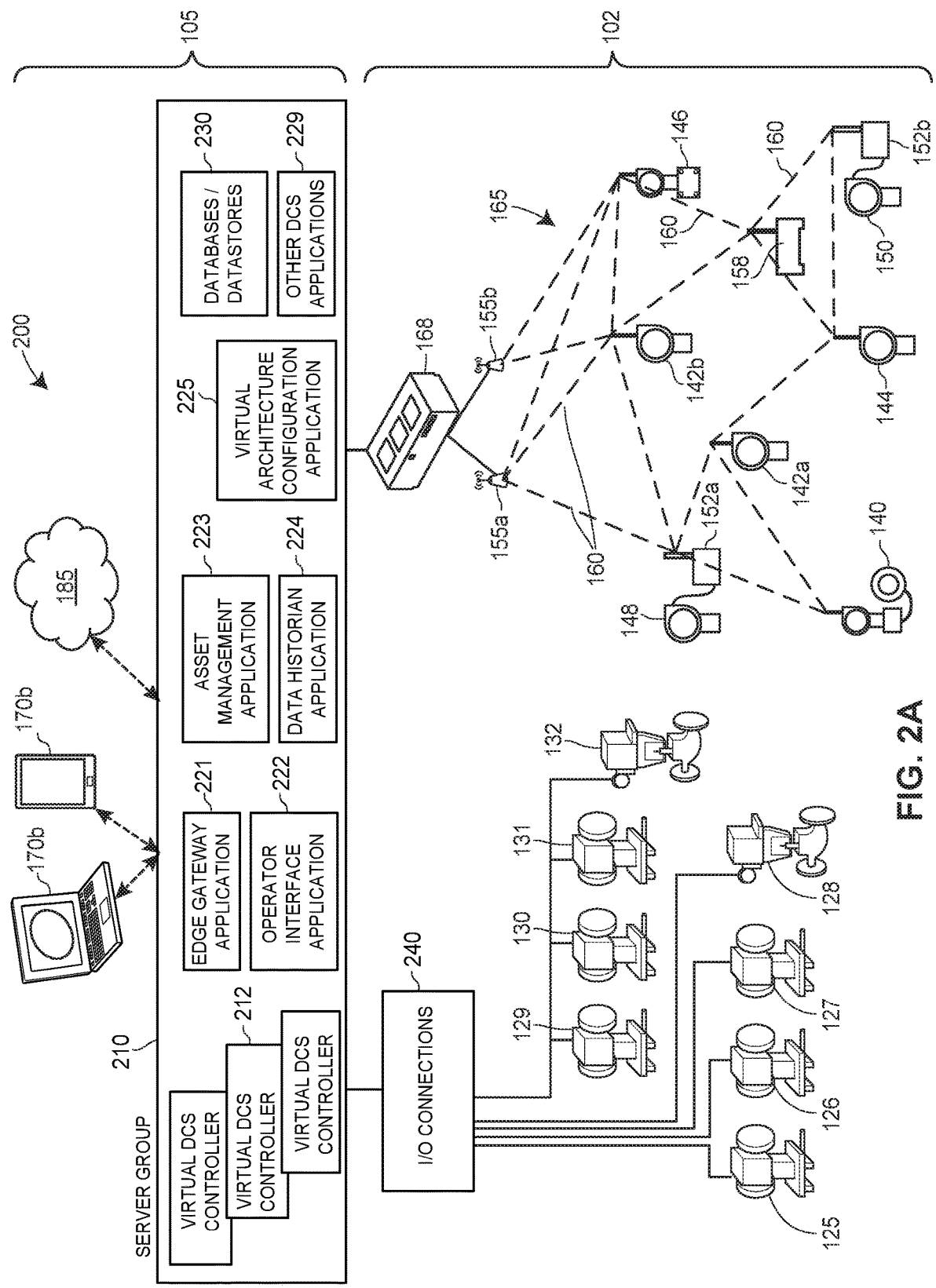
FIGS. 2A and 2B illustrate block diagrams of the example process plant of FIG. 1 in which a software-defined DCS environment running on a server group controls at least a portion of the process plant.
Figure 2B:
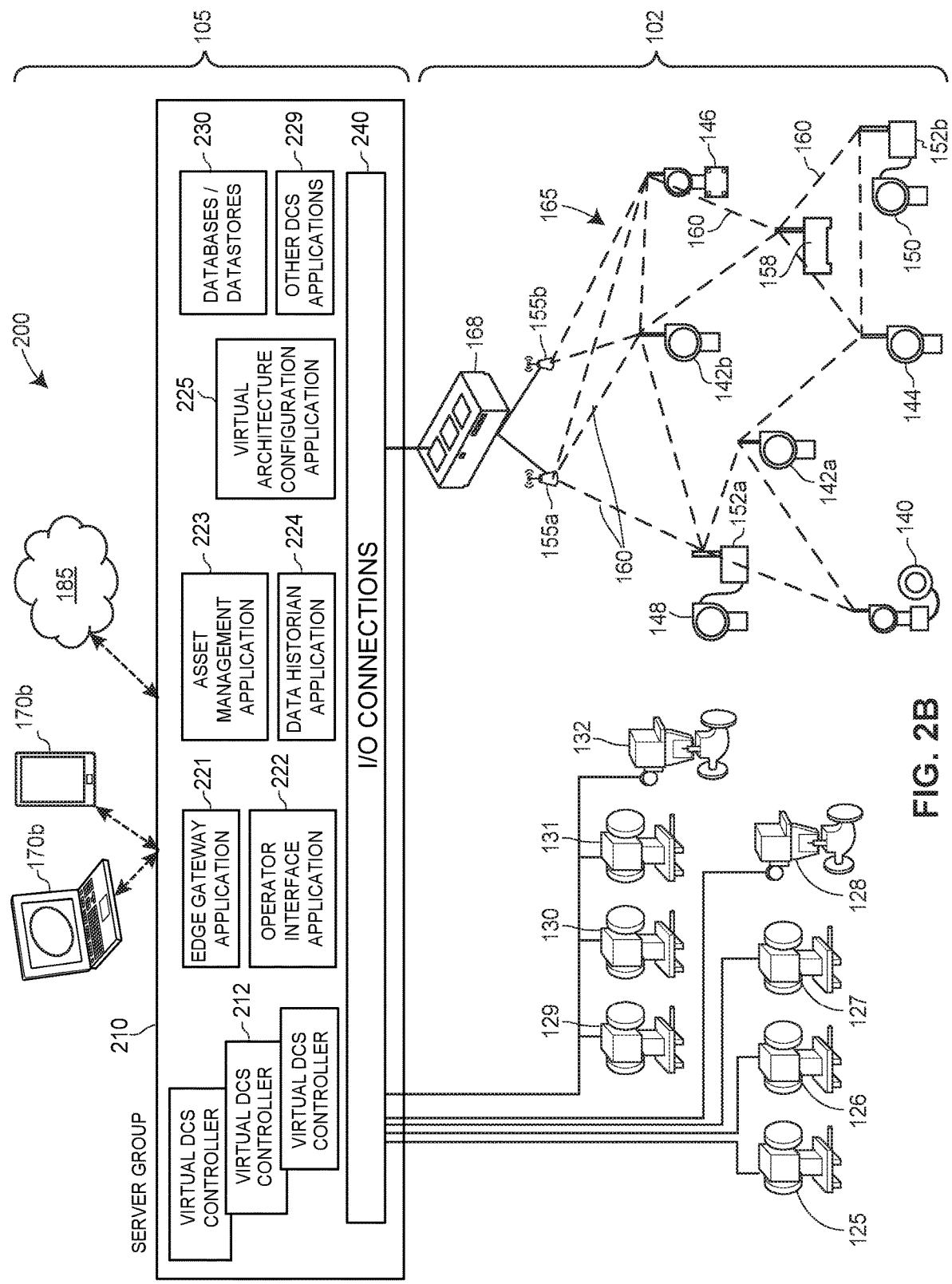

FIGS. 2A and 2B illustrate block diagrams of the example physical process plant 100 of FIG. 1 in which a software-defined DCS environment 200 running on a server group 210 controls at least a portion of the process plant. In both illustrated embodiments of the software-defined DCS environment 200, the controllers 110 of the physical process plant 100 are implemented as software-defined process controllers (virtual DCS controllers 212) within a server group 210 in the back-end environment 105. In addition to the virtual DCS controllers 212, the server group 210 also implements various DCS applications 221-225 and 229 to provide higher-level functionality, configuration, monitoring, and analysis of the process and of the virtual DCS controllers 212. The server group 210 also includes one or more databases or datastores for process data relevant to the virtual DCS controllers 212 and the DCS applications 221-225 and 229. Although the exemplary software-defined DCS environment 200 is illustrated as implementing a plurality of virtual DCS controllers 212, this should be understood as an example of implementation of software-defined infrastructure in which hardware and software resources are pooled within a software-defined environment to facilitate policy-based infrastructure provisioning.

Software-defined DCS control of the process in the server group 210 provides multiple advantages, including improving system robustness by enabling load balancing and protecting against component failure, reducing equipment requirements by combining the controllers with the same hardware, and reducing configuration effort by reducing network complexity. FIG. 2A illustrates an embodiment of the software-defined DCS environment 200 in which I/O connections 240 are handled by components in the field environment 102, while FIG. 2B illustrates an embodiment of the software-defined DCS environment 200 in which the I/O connections 240 are handled by the server group 210 in the back-end environment 105. Further embodiments may include combinations of I/O connections 240 in both the field environment 102 and the back-end environment 105 (e.g., smart field devices may be capable of direct communication with the server group 210 via a data communication network, while legacy field devices may require an I/O device to covert between an industrial process control communication protocol used by the field devices and a general IT communication protocol used by the servers).

As described above with respect to FIG. 1, a plurality of field devices 125-132, 140-150 within the field environment 102 control at least a portion of an industrial process based upon control signals from DCS controllers. In the software-defined DCS environment 200, such control signals are generated by virtual DCS controllers 212 implemented by one or more servers within the server group 210. The virtual DCS controllers 212 operate in substantially the same manner as the (physical) controllers 110 to implement process control logic configured to monitor and control the process in the real-time. However, the virtual DCS controllers 212 are implemented as computer-executable instructions within the server group 210, rather than within special-purpose hardware controllers 110 in the field environment 102. For example, the virtual DCS controllers 212 may be virtual instances of control programs operating within a real-time operating environment implemented by one or more hypervisors running on the server group 210 to simulate a native operating environment of each of the virtual DCS controllers 212. Each virtual DCS controller 212 in the software-defined DCS environment 200 implements process control loops using one or more function blocks to monitor and control the process via the field devices 125-132, 140-150. Thus, the virtual DCS controllers 212 are consolidated within the server group 210 in order to control of the process (or portion thereof) from one location, enhancing communication between the control modules. In some embodiments, multiple virtual DCS controllers 212 may be implemented to control different portions of the process, similar to the use of multiple physical controllers in physical DCS networks. As discussed further below, load balancing and redundancy may be achieved by implementing multiple instances of each virtual DCS controller 212 in different servers of the server group 210.

In addition to the virtual DCS controllers 212, in some embodiments other network components may be virtualized in the software-defined DCS environment 200 to produce a virtual network defined by software running on the server group 210. Such virtual network includes a plurality of virtual nodes associated with physical nodes in the physical process plant 100. Such virtual nodes may include virtual components representing the various hardware components present in the communication network of the field environment 102, such as networking switches, routers, firewalls, and other network devices. These virtual nodes may include networking components such as wireless gateways 168, wireless adaptors 152, access points 155, or routers 158, as described above. In further embodiments, the virtual network may include virtual representations of field devices for control and communication with the field devices 125-132, 140-150. Virtual representations of field devices may be implemented within the virtual DCS controllers 212 using device function blocks, shadow function blocks, or other such techniques used in DCS environments. Thus, in such embodiments, the software-defined DCS environment 200 includes a virtual representation of the physical components of the process control system in the field environment (e.g., field devices and necessary networking components), as well as the virtual DCS controllers 212 that replace the physical controllers.

To maintain communication connections with the field devices 125-132, 140-150, the software-defined DCS environment 200 may include or be connected to I/O connections 240 configured to provide a communication link between the server group 210 and the physical components of the communication network of the field environment 102. The I/O connections 240 include physical networking components that connect the server group 210 to the field devices 125-132, 140-150, either directly or indirectly. Such components may include ports, switches, or routers. The I/O connections 240 pass process data between the virtual DCS controllers 212 and the field devices 125-132, 140-150. Thus, the I/O connections 240 receive process data from the field devices 125-132, 140-150 and send such process data to the virtual DCS controllers 212, and the I/O connections 240 also receive process control signals from the virtual DCS controllers 212 and send such process control signals to the field devices 125-132, 140-150.

In some embodiments, the I/O connections 240 may include an I/O server configured to map physical nodes within the field environment 102 with virtual nodes within the software-defined DCS environment 200, thus enabling the virtual DCS controllers 212 to communicate with virtual nodes maintained by the I/O server without detailed knowledge of the physical network within the field environment 102. For example, the I/O server may map physical nodes associated with the field devices 125-132, 140-150 with virtual nodes associated with corresponding virtual field devices by a publication/subscription mapping to provide real-time communication of data between the server group 210 and the components of the field environment 102 (e.g., the field devices 125-132, 140-150). By routing all communications to the server group 210, the I/O connections 240 decouple hardware and software communications configuration, thereby enabling all the virtual DCS controllers 212 in the server group 210 to access any process data without requiring configuration of separate hardware connections for each controller to each data source.

In further embodiments, the I/O connections 240 may also convert the process data (including process control signals) between server communication protocols used by the virtual DCS controllers 212 and industrial process control communication protocols used by the field devices 125-132, 140-150. For example, the server group 210 may be configured to communicate data using a general IT communication protocol (e.g., an Ethernet protocol, an IP protocol, or another packet protocol), while the field devices 125-132, 140-150 may be configured to communicate using industrial process control communication protocols (e.g., Profibus, DeviceNet, Foundation Fieldbus, ControlNet, Modbus, HART, etc.).

Although illustrated in FIG. 2A as being separate from the server group 210, the I/O connections 240 may alternatively be incorporated into the server group 210, as illustrated in FIG. 2B. Likewise, the I/O connections 240 may connect the server group 210 with only a subset of the field devices (e.g., field devices 125-132 as shown in FIG. 2A) or may connect the server group 210 with all the field devices in the field environment 102 (e.g., field devices 125-132 and 140-150 as shown in FIG. 2B). As illustrated in FIG. 2A, other networking components (such as the wireless gateway 168) may connect some of the field devices (such as field devices 140-150) to the server group 210 directly, such as by a direct physical connection or through a local area network (not shown) in the back-end environment 105. For example, within a server room in the back-end environment 105, a wireless gateway 168 may be physically connected via a wired communication cable to one or more server racks comprising the server group 210.

In addition to the virtual DCS controllers 212, the software-defined DCS environment 200 also includes one or more DCS applications 221-225, 229 running on the servers of the server group 210. These DCS applications 221-225, 229 are configured to interact with the virtual DCS controllers 212 to configure, monitor, control, and/or analyze operation of the process within the physical process plant 100. The DCS applications operate in a manner similar to the various applications and gateways of the back-end environment 105 in a traditional DCS configuration (such as that illustrated in FIG. 1) to obtain data from the virtual DCS controllers 212 and to adjust the operation of the virtual DCS controllers 212 in controlling the physical process. However, implementing the DCS applications 221-225, 229 within the server group 210 together with the virtual DCS controllers 212 simplifies configuration and communication. In some embodiments, the software-defined DCS environment 200 may implement one or more operating systems within which one or more of the DCS applications 221-225, 229 natively operate, in addition to the real-time environment in which the virtual DCS controllers 212 operate.

The DCS applications 221-225, 229 may include a number of applications for implementing control, configuration, communication, or analysis functionalities. One or more user interface devices 170b (e.g., workstations, desktop computers, or mobile computing devices) may be used by one or more operators to interact with the DCS applications 221-225, 229 of the software-defined DCS environment 200. For example, an operator may use a desktop computer or smartphone to interact with the DCS applications 221-225, 229 to obtain information regarding the process, adjust operation of the virtual DCS controllers 212, or analyze the process or the condition of the physical process plant 100.

An edge gateway application 221 may be configured to provide communication with other networks 185, similar to the edge gateway system 182 in FIG. 1. Such other networks may include external networks remote from the process plant. An operator interface application 222 may be configured to provide an operator interface or workstation interface to an operator in order to enable the operator to monitor and control run-time operation of the process, similar to the operator workstations 170a. For example, an operator may use a user interface device 170b to access the operator interface application 222 running on the server group 210 to take any diagnostic, corrective, maintenance, and/or other actions that may be required to operate the physical process plant 100. Such actions may include setting or adjusting operating parameters, control setpoints, or control schemes used by the virtual DCS controllers 212. Because the virtual DCS controllers 212 all operate within the software-defined DCS environment 200 and the server group 210, the operator interface application 222 may be configured to apply global changes to all the virtual DCS controllers 212 or other components of the software-defined DCS network architecture. For example, operator interface application 222 may be configured to apply a system-wide lock to prevent downloading control modules to the virtual DCS controllers 212 (e.g., to prevent accidental or unauthorized changes while the process is running). An asset management application 223 may be configured to provide information regarding assets within the physical process plant 100, as well as information regarding utilization of assets.

A data historian application 224 may be configured to store process data within the software-defined DCS environment 200 during operation of the process for later use in process analysis or control. By implementing the data historian application 224 in the server group 210 with the virtual DCS controllers 212, it is possible to store more detailed process data than would otherwise be possible. Since all the process data used by and generated by the virtual DCS controllers 212 is available at the server group 210, further communication outside the server group 210 is not required to historicize the data. Thus, the data historian application 224 may be configured to store high-fidelity data automatically during process operation. Such process data may be stored in the databases or datastores 230 of the server group 210, which may also store configuration or other data used by the virtual DCS controllers 212 or the DCS applications 221-225, 229.

A virtual architecture configuration application 225 may be configured to define a software-defined DCS network architecture (e.g., virtual DCS network architecture) by specifying a plurality of software-defined virtual nodes within the software-defined DCS network architecture and connections between such nodes, similar to definition of the network architecture of the physical process plant 100 by the configuration application 172a. For example, virtual nodes in a virtual DCS network architecture may be used to represent the physical network architecture of the components of the field environment 102 in order to enable the virtual DCS controllers 212 to control the process. Thus, the virtual nodes may include virtual representations of the plurality of field devices. To define the software-defined DCS network architecture, the virtual architecture configuration application 225 may provide a user interface configure to enable an operator to define virtual nodes. In some embodiments, the virtual architecture configuration application 225 may configure the I/O connections 240 to facilitate communication between the server group 210 and the field devices 125-132, 140-150. In further embodiments, information regarding the type of process data received from the components of the field environment 102 by the I/O connections 240 may be provided to the virtual architecture configuration application 225 in order to determine part or all of the software-defined DCS network architecture automatically based upon the type of process data received. However defined or determined, the software-defined DCS network architecture may be stored as configuration data in one or more databases or datastores 230, similar to the configuration databases 172b.

In some embodiments, other DCS applications 229 may be implemented within the software-defined DCS environment 200 on the server group 210 in order to provide additional or alternative functionality. Such other DCS applications 229 may include human-machine interface applications, engineering workstation applications, manufacturing executing system applications, advanced process control system applications, network communication applications, security applications, or other applications for performing process control, monitoring, testing, maintenance, optimization, or analysis relating to the process of the physical process plant 100. As an example, the other DCS applications 229 may include an emulator application configured to run third-party software applications within the server group 210 by emulating a native operating environment of such third-party software applications within the software-defined DCS environment 200. Thus, legacy or other software applications may be integrated into the software-defined DCS environment as though they were running in separate computing devices in the physical process plant 100. As another example, the other DCS applications 229 may include a real-time process model application configured to optimize, tune, or otherwise adjust the process control loops of the virtual controllers 212 during operation of the process (e.g., by performing adaptive process control to select or adjust process models based upon variable plant parameters). As an additional example, the other DCS applications 229 may include a security policy manager application configured to set software-defined security permissions or policies for the various components of the software-defined DCS environment 200, such as operating environments (e.g., hypervisor environments or software containers), virtual nodes (e.g., field devices, routers, or switches), software-defined process controllers (e.g., virtual DCS controllers 212, control modules, function blocks), or other DCS applications. As yet another example, the other DCS applications 229 may include a network architecture configuration application configured to automatically detect physical networking components within the field environment 102 (e.g., switched or routers) and configure such physical networking components for communication within the communication network in the field environment 102. In some such embodiments, the network architecture configuration application may further configure the I/O connections 240 for communication between the field environment 102 and the server group 210.

In some embodiments, the server group 210 may be communicatively coupled to one or more additional server group 210 associated with the physical process plant 100 or with other process plants or with other systems. In some such embodiments, the other server groups 210 may be configured to operation portions of the physical process plant 100. Similarly, in further embodiments, the virtual DCS controllers 212 of the server group 210 may control only a portion of the physical process plant 100, with one or more physical controllers 110 communicatively connected to the server group 210 to control other portions of the physical process plant 100 in a hybrid control architecture. In some such hybrid control architectures, the physical controllers 110 may nonetheless be represented as a node within the software-defined DCS environment 200 for purposes of enabling hardware-independent interactions between such controllers 110 and other components in the software-defined DCS architecture.

Server Group for Software-Defined DCS Environment

Figure 3:
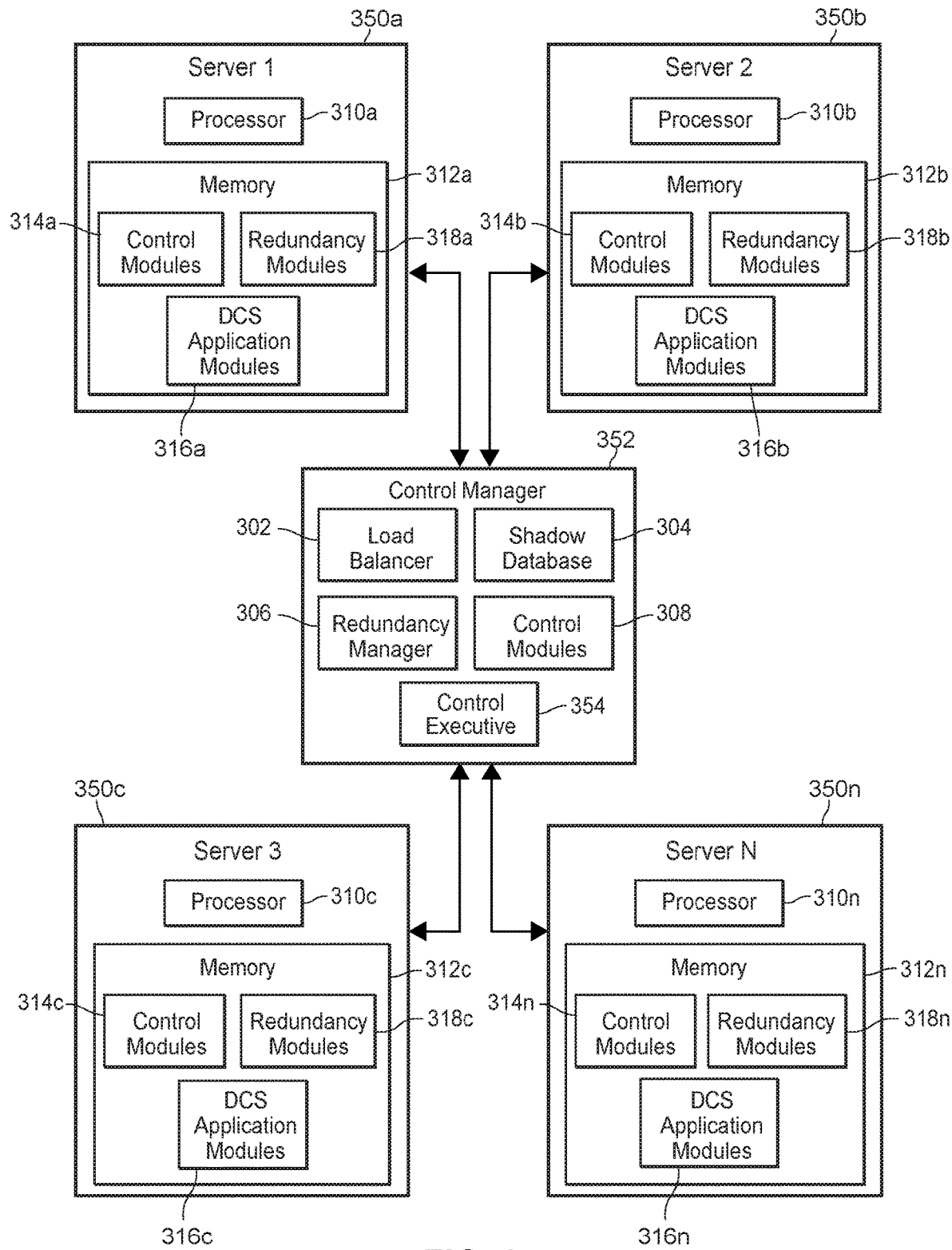
FIG. 3 illustrates a block diagram of an example redundant server group implementing a software-defined DCS environment, such as the server group illustrated in FIGS. 2A and 2B.

FIG. 3 illustrates a block diagram of an example redundant server group 300 implementing a software-defined DCS environment 200, such as the server group 210 illustrated in FIGS. 2A and 2B. As described above, the software-defined DCS environment 200 implemented by the server group 210 may include a plurality of virtual DCS controllers 212 (or other software-defined process controllers) and a plurality of DCS applications 221-225, 229. To implement these software components, the server group 210 may include a plurality of servers 350a-n controlled by a control manager 352, as illustrated in the redundant server group 300 in FIG. 3. By implementing the virtual DCS controllers 212 and the DCS applications 221-225, 229 in the plurality of servers 350a-n, the redundant server group 300 facilitates both efficient balancing of load between the servers 350a-n and robust failover capability should any of the servers 350a-n fail. Thus, multiple instances of each of the virtual DCS controllers 212 may run simultaneously on different servers 350a-n, which instances of the virtual DCS controllers 212 may include control modules 314a-n and redundant modules 318a-n coordinated by the control manager 352. Based upon the statuses (e.g., availability) of the servers 350a-n, the control manager 352 may perform automatic load balancing between the servers 350a-n by allocating modules between the servers 350a-n.

In some embodiments, the servers 350a-n and control manager 352 may each include one or more blades connected in one or more server racks to form the redundant server group 300. Each of the blades 350a-n, 352 may be a thin electronic circuit board having one or more processors and a memory. The processors within each of the blades 350a-n, 352 may include multi-core hardware, such as a multi-core processor or another type of parallel processor. Additionally, the memory within each of the blades 350a-n, 352 may include high density memory storage technology, for example, solid state drive memory, semiconductor memory, optical memory, molecular memory, biological memory, or any other suitable high density memory technology. In some embodiments, the memory storage may also include flash memory. The memory storage (and, in some cases, the flash memory) may be configured to temporarily store or cache data that is generated by, received at, or otherwise observed by the respective blade 350a-n, 352.

In any event, each server 350a-n includes control routines or modules that correspond to a subset of the field devices 125-132, 140-150 to control at least a portion of the process within the physical process plant 100. While several servers 350a-n within the redundant server group 300 may provide control signals to the same subset of field devices 125-132, 140-150, multiple servers 350a-n may not provide control signals to the same field device and/or for the same parameters within the same time interval. For example, a first server 350a and a second server 350b may not provide control signals to the same valve instructing the valve to open or close within the same time interval. In some embodiments, the control manager 352 assigns control modules to the servers 350a-n such that multiple servers 350a-n cannot provide control signals to the same field device and/or for the same parameters within the same time interval. Additionally or alternatively, a control monitor module within the redundant server group 300 may monitor the control outputs from the servers 350a-n to determine whether any two control outputs are going to the same field device and/or are for the same parameter within the same time interval. When this occurs, the control monitor module may override the control signals to ensure that only one of the control signals is provided to the field device. The control monitor module may also provide a request to one of the servers 350a-n or to the control manager 352 to stop providing control signals to the field device during the time interval. However, multiple servers 350a-n may receive outputs from the same field device within the same time interval, such as the valve opening percentage from the same valve.

In some embodiments, for each of the control routines or modules executed by the servers 350a-n, one of the servers 350a-n may include a redundancy module. The redundancy module may cause the server 350b executing the redundancy module to stay in sync with the server 350a executing the control module, so that the server 350b executing the redundancy module is available to take over and execute the control module if the server 350a currently executing the control module fails. To stay in sync with the server 350a executing the control module, the redundancy module may cause the server 350b executing the redundancy module to receive the same inputs, outputs, setpoints, etc. being received and provided by the server 350a executing the control module. The server 350a executing the control module may be a different server or blade than the server 350b executing the redundancy module. Similar to the control modules, the redundancy modules may be software, firmware, hardware, etc. Redundancy modules may be implemented in any desired software format, such as using object oriented programming, ladder logic, sequential function charts, function block diagrams, or using any other software programming language or design paradigm.

Also in some embodiments, each server 350a-n includes DCS application modules 316a-n to implement the DCS applications 221-225, 229 discussed above. Similar to the control modules 314a-n, the DCS application modules 316a-n may be software, firmware, hardware, etc. The DCS application modules 316a-n may be implemented in any desired software format, such as using object oriented programming, ladder logic, sequential function charts, function block diagrams, or using any other software programming language or design paradigm.

In addition to the servers 350a-n, the redundant server group 300 includes a control manager 352 that assigns control modules, redundancy modules, DCS application modules, and any other suitable operations to the servers 350a-n. In some embodiments, the control manager 352 is implemented in hardware and is one of the blades within the blade servers. In other embodiments, the control manager 352 is a software application that may be implemented in any of the blades 350a-n, 352 in the redundant server group 300. The redundant server group 300 may include a single control manager 352 implemented on a single blade that manages control for each of the controllers within several blade servers. In other embodiments, the control manager 352 may be implemented across several blades. In yet other embodiments, the redundant server group 300 may include one or several rack servers each having several mounting slots such that the blades 350a-n, 352 correspond to bays 350a-n, 352 in the rack servers.

In other embodiments, the redundant server group 300 includes cloud servers in a cloud computing environment, fog servers in a fog computing environment, where the fog computing environment is for example hosted by the organization that operates the physical process plant 100, or any suitable combination of these. For example, while a cloud computing environment may include servers that control processes in process plants throughout the United States or even the world, the fog computing environment may include servers that control processes in the physical process plants 100 in a particular city or town.

The control manager 352 communicates with the several servers 350a-n in the redundant server group 300. Each of the servers 350a-n and the control manager 352 may be physical machines (e.g., hardware) or virtual machines (e.g., software). In this manner, a single blade may host several guest virtual machines or servers. In any event, the control manager 352 includes a control executive 354, a load balancer 302, a shadow database 304, a redundancy manager 306, and control modules 308. Each of the servers 1-N (ref. nos. 350a-n) includes a processor 310a-n, such as a multi-core processor or another type of parallel processor and a memory 312a-n which may be a high density memory. Each of the memories 312a-n may store various routines assigned to the respective server 350a-n, including control modules 314a-n, DCS application modules 316a-n, and redundancy modules 318a-n.

In addition to storing and executing routines to control and monitor operations within the physical process plant 100, the servers 350a-n may provide indications of availability or status to the control manager 352. In some embodiments, each of the servers 350a-n provides an availability metric for a particular time interval to the control manager 352 based on the load at the server 350a-n, the available amount of memory at the server 350a-n, and bandwidth for transmitting data from the server 350a-n at the particular time interval. In other embodiments, each of the servers 350a-n provides indications of the load at the server 350a-n, the available amount of memory at the server 350a-n, and bandwidth for transmitting data from the server 350a-n for a particular time interval. The control manager 352 then determines an availability metric for the particular time interval for each server 350a-n based on this information. The load at the server 350a-n may indicate the amount of processing being performed by the server 350a-n as well as the processing capabilities of the server 350a-n (e.g., single core, dual core, quad-core, etc.). The availability metric may also account for failed or otherwise unavailable severs based upon a failure of the server to provide an indication or respond to the control manager 352.

The control executive 354 at the control manager 352 may receive operations to be performed by the servers 350a-n in the redundant server group 300. In some embodiments, the redundancy manager 306 generates a redundancy module for each control module 308 obtained by the control manager 352. The redundancy module may cause the server 350a-n executing the redundancy module to receive the same inputs, outputs, setpoints, etc. being received and provided by the server 350a-n executing the control module without executing the control loops or functions included in the control module. In some embodiments, the control executive 354 provides each of the obtained control modules 308 to the redundancy manager 306 for the redundancy manager to generate a corresponding redundancy module.

Also in some embodiments, the control executive 354 assigns a priority level to each of the control modules, redundancy modules, and DCS application modules and ranks the modules in order of priority. Priority levels may be assigned automatically based on a predetermined set of priority rules (e.g., a redundancy module has the same priority level as a corresponding control module, control modules have higher priority levels than DCS application modules, etc.). Additionally or alternatively, a user may assign the priority level for each of the modules. For example, when a configuration engineer generates a control module via a configuration application, the configuration engineer may also assign a priority level for the control module.

The control executive 354 may communicate with the load balancer 302 to determine which server 350a-n should execute which control modules 308, redundancy modules, and DCS application modules during a particular time interval. In some embodiments, the load balancer 302 receives an availability metric for each of the servers 350a-n and a list of control modules, redundancy modules, and DCS application modules to be executed within a particular time interval, which may include respective priority levels for each of the modules. The load balancer 302 then assigns a server 350a-n in the redundant server group 300 to execute each of the modules. In some scenarios, a single server 350a-n may execute several modules within the same time interval depending on the parallel processing capabilities and memory density of the server 350a-n. In another example scenario, the load balancer 302 identifies two different servers 350a-n to execute a control module and a redundancy module, so that the server 350a-n executing the redundancy module can take over for the server 350a-n executing the control module in the event of a failure at the controller.

In some embodiments, the load balancer 302 identifies characteristics of each of the modules, such as whether each module is executed periodically or based on the occurrence of an event (event driven), the execution time for each module, or any other suitable characteristics. Then the load balancer 302 identifies servers 350a-n to execute the modules based on the availability metrics for the servers 350a-n and the priority levels and characteristics of the modules. More specifically, the load balancer 302 uses a load balancing algorithm to assign servers 350a-n to execute the modules.

For example, the load balancer 302 may rank each of the servers 350a-n according to their respective availability metrics, where the server 350a-n having the highest availability metric has the greatest amount of availability and is ranked highest. The load balancer 302 may also rank each of the modules based on a combination of the priority level and characteristics for each module. In some embodiments, periodic modules are ranked above event driven modules, then each of the periodic modules are categorized based on priority level and each of the event driven modules are categorized based on priority level. Each of the periodic modules in the high priority category may be ranked above each of the periodic modules in the medium priority category and so on. Periodic or event driven modules in the same priority category may be further ranked based on execution time. More specifically, when there are three priority categories (high, medium, and low), and periodic and event driven modules, the high priority periodic modules may be ranked first where each module in this category is further ranked in order of execution time, followed by the medium priority periodic modules, followed by the low priority periodic modules, followed by the high priority event driven modules, etc.

Accordingly, the load balancer 302 may rank the servers 350a-n and may rank the modules. While the servers 350a-n are ranked in the above example in order of availability metrics and the modules are ranked in order of priority levels and module characteristics, the servers 350a-n and modules may be ranked in any suitable manner.

Then the load balancer 302 may use a reversing round-robin mechanism to first assign the highest ranked module (e.g., a high priority periodic module having the longest execution time) to the highest ranked server 350a-n (e.g., the controller having the highest availability metric). The second highest ranked module may be assigned to the second highest ranked server 350a-n and the algorithm may continue in this manner until the lowest ranked server 350a-n is assigned a module. If there are more modules to assign, the load balancer 302 continues to assign modules in reverse order. For example, the load balancer 302 also assigns the next module to the lowest ranked server 350a-n and then assigns the module ranked below the next module to the second lowest ranked server 350a-n and continues in increasing order until the highest ranked server 350a-n is assigned two modules. Then the load balancer 302 once again reverses the order to assign modules in decreasing order and continues in the reversing round robin manner until each of the modules are assigned to servers 350a-n.

While the load balancer 302 may rank the servers 350a-n and the modules and use a reversing round-robin mechanism to assign modules to servers 350a-n, the load balancer 302 may assign modules to servers 350a-n in any suitable manner to distribute the modules amongst the servers 350a-n in the redundant server group 300. In other embodiments, the modules are distributed equally or at least similarly amongst the servers 350a-n regardless of priority level or characteristics. In yet other embodiments, the load balancer 302 assigns modules to the same server 350a until the processing at the server 350a reaches capacity. Then the load balancer 302 assigns modules to another server 350b until the processing at the other server 350b reaches capacity and the load balancer 302 may continue to assign modules in this manner.

In any event, the control executive 354 then provides the assigned modules to the corresponding servers 350a-n, so that each server 350a-n may execute the assigned modules. In some embodiments, the control executive 354 analyzes the assignments and may adjust some of the assignments to ensure that multiple servers 350a-n are not providing control signals to the same field device and/or for the same parameter within the same time interval.

In an exemplary scenario, during a first time interval a server 350a may be assigned a first set of modules. The control executive 354 may download the control modules 314a, DCS application modules 316a, and redundancy modules 318a to the server 350a during the first time interval. Then during a second time interval, the server 350a may be assigned a second set of modules different from the first set of modules. The control executive 354 may download the new control modules 314a, DCS application modules 316a, and redundancy modules 318a to the server 350a during the second time interval.

In another exemplary scenario, during a particular time interval the control manager 352 assigns a first control module to a first server 350a, where the first control module corresponds to a first subset of the field devices 125-132, 140-150. The control manager 352 assigns a second control module to a second server 350b, where the second control module corresponds to a second subset of the field devices 125-132, 140-150. The first server 350a then executes the first control module and the second server 350b executes the second control module within the same time interval. During a later time interval, the first server 350a is no longer assigned the first control module and the second server 350b is assigned both the first and second control modules. For example, the first server 350a may have failed or may not have the processing resources to execute the first control module during the later time interval. The second server 350b then executes the first and second control modules for the first and second subsets of the field devices 125-132, 140-150, respectively during the later time interval.

In some embodiments, periodic modules remain assigned to the same server 350a-n for several time intervals, whereas event driven modules may be reassigned to the servers 350a-n for each time interval based on the availability metrics of the servers 350a-n at the particular time interval. In other embodiments, each of the control modules, DCS application modules, and redundancy modules are downloaded to each of the servers 350a-n prior to execution (e.g., when the modules are generated) and stored in their respective memories 212a-n. When the control executive 354 selects a server 350a to execute a particular module, the control manager 352 provides an indication of the particular module to the selected server 350a and the selected server 350a retrieves the particular module from memory 312a and executes the particular module by the processor 310a.

In some embodiments, the control manager 352 includes a shadow database 304 that stores input data for the control modules, redundancy modules, and DCS application modules. Input data for the modules may be obtained from user interface devices 170b when the modules are configured or generated, for example. The input data may also be obtained from the servers 350a-n when the servers 350a-n execute the control modules 314a-n and the DCS application modules 316a-n. Outputs from the control modules 314a-n and the DCS application modules 316a-n may be received at the shadow database 304 from the servers 350a-n and stored as input data for control modules, redundancy modules, and DCS application modules executed during subsequent time intervals.

In some embodiments, the control manager 352 may further provide availability information regarding the status or availability of the servers 350a-n. Such information may include total load or availability metrics for the redundant server group 300, availability metrics for the individual servers 350a-n, operating statuses of the individual servers 350a-n (e.g., operational or non-operational), or other similar metrics. In some embodiments, the control manager 352 may further provide usage information regarding resource usage within the redundant server group 300, such information indicating the processing resources needed or expected to be needed to execute the control modules, redundancy modules, and DCS application modules in the servers 350a-n. From the availability information and usage information, the control manager 352 may further calculate or predict an optimal resource allocation for the redundant server group 300, such as a number or type of servers 350a-n to be connected within the redundant server group 300. Such calculation or prediction may be presented to an operator to enable adjustments to the hardware configuration of the redundant server group 300 (e.g., adding or replacing servers). In some embodiments, such calculation or prediction may be performed by a DCS application, such as an asset management application 223 or other DCS application 229.

Configuration and Operation of Software-Defined DCS Environment

Figure 4:
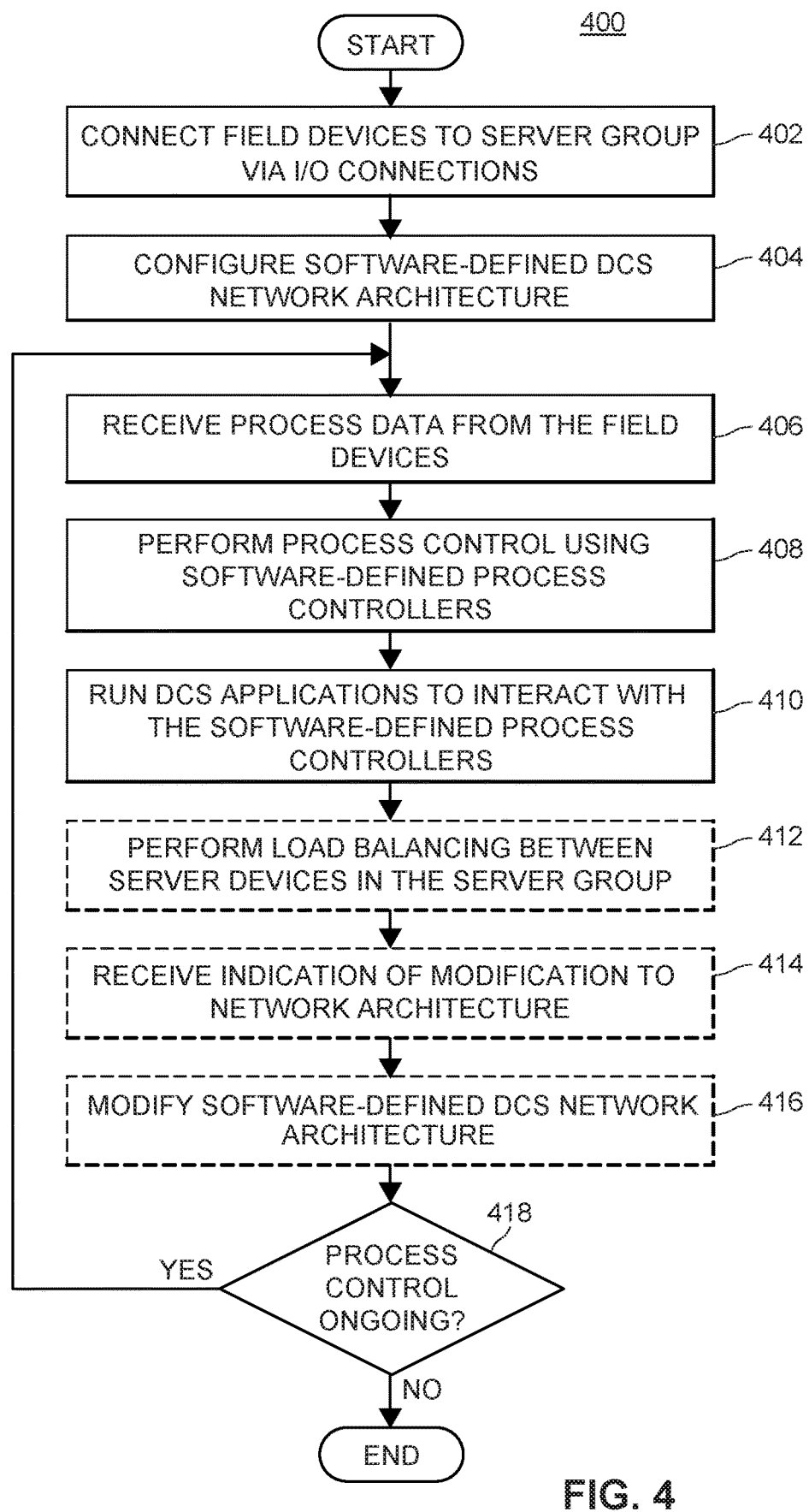
FIG. 4 illustrates a flow diagram of an example software-defined DCS architecture configuration and control method.

FIG. 4 illustrates a flow diagram of an example software-defined DCS configuration and control method 400 for a physical process plant 100 controlled by software-defined process controllers of a software-defined DCS environment 200. The virtual DCS configuration and control method 400 may be performed to set up, operate, monitor, and adjust a process control system to operate a process within a physical process plant 100 using a software-defined DCS environment 200, such as that described above. Some aspects of the software-defined DCS configuration and control method 400 may be performed manually or may be automated in some embodiments. Alternative embodiments may include additional, fewer, or alternative aspects.

The software-defined DCS configuration and control method 400 begins with the connection of at least some of the field devices 125-132, 140-150 to the server group 210 via the I/O connections 240 (block 402). This may include physically connecting the field devices 125-132, 140-150 during physical installation within the plant or when a field device is added to an existing process control network. In some embodiments, the field devices 125-132, 140-150 may be connected by establishing software-defined communication connections through the I/O connections 240 after installation within the plant, such as by establishing publication/subscription connections in an I/O server. In some embodiments, not all field devices 125-132, 140-150 may need to be connected to the server group 210 for control of a process, and some field devices 140-150 may instead be connected directly to the server group 210 through a wireless gateway 168 in some embodiments.

Once the relevant field devices 125-132, 140-150 are connected to the server group 210, the software-defined DCS network architecture is configured to represent the process control network of the field environment 102 as a software-defined network of nodes and connections within the software-defined DCS environment 200 (block 404). To configure the software-defined DCS network architecture, the virtual architecture configuration application 225 may generate and present a user interface to a user (e.g., an engineer configuring the process control system), which user interface may include a plurality of options to configure components and connections within the software-defined DCS network. Thus, the user may be presented with options to add, remove, edit, connect, and specify parameters of the software-defined components via the user interface. Upon receiving user input from the user, the virtual architecture configuration application 225 may define the software-defined DCS network architecture by specifying the nodes and connections within the software-defined DCS network based upon the user input. Additionally or alternatively, part or all of the software-defined DCS network architecture may be automatically determined by the virtual architecture configuration application 225 based upon information regarding the type of process data received from the components of the field environment 102, such as the field devices 123-132, 140-150. The information regarding the types of process data is determined based upon data traffic from the field devices 123-132, 140-150 at the I/O connections 240. In some such embodiments, information regarding the types of process data received from such components of the field environment 102 may be obtained by the virtual architecture configuration application 225 from the I/O connections 240 (e.g., from an I/O server). In further such embodiments, the determined types of process data may be presented to the operator via a user interface of the virtual architecture configuration application 225 for confirmation or adjustment. The software-defined DCS network architecture is then stored in the databases or datastores 230 of the server group 210 for use by the software-defined process controllers and DCS applications (e.g., the virtual DCS controllers 212 and the DCS applications 221-225, 229).

In some embodiments, the software-defined DCS network architecture provides a plurality of classes of service for the various components with the software-defined DCS environment in order to ensure appropriate handling of resource requirements. For example, real-time processes (e.g., process control by the control modules) are assigned a high-priority class to ensure that time-sensitive process control routines are given priority over analytical processes of the DCS applications. In further embodiments, multiple classes of real-time processes may be used to give higher priority to process-critical or safety essential processes. Similarly, classes may be based upon or used to differentiate bandwidth requirements of processes within the software-defined DCS environment 200.

The server group 210 is then prepared to preform process control. During operation of the physical process plant 100, the software-defined process controllers (e.g., virtual DCS controllers 212) receive process data from the field devices 125-132, 140-150 (block 406) and implement process control logic to control the process in real time (block 408). The process data may be generated by and received from one or more of the field devices 125-132, 140-150 via the I/O connections 240. At least part of such process data is then used by the software-defined process controllers to generate process control signals to control the process in the physical process plant 100. Such process control signals are then sent to one or more of the field devices 125-132, 140-150 to implement control actions to control the process (e.g., adjusting a valve position or controlling a heating element). The process control signals may be sent to the relevant field devices 125-132, 140-150 via the I/O connections 240.

Also during operation of the process, the server group 210 implements one or more of the DCS applications 221-225, 229 to interact with the software-defined process controllers (block 410). The DCS applications 221-225, 229 may run in the server group 210 In some embodiments, the operator interface application 222 may operate to adjust the operation of one or more of the software-defined process controllers, such as by adjusting setpoints or tuning the control modules used by the software-defined process controllers to improve process control. Such adjustments may be automatically made by the DCS applications 221-225, 229 or may be made in response to user input. Of course, any combination of the DCS applications 221-225, 229 may be implemented while the process is running in the physical process plant 100 or at another time before, after, or between implementing the process. As an example, the data historian application 224 may operate while the process is ongoing to monitor process data within the software-defined DCS environment 200 and store such process data in a database or datastore 230 for later analysis. Such monitoring may include selecting a subset of the process data available (e.g., by sampling the process data or selecting relevant data received from the field environment 102 or generated by the virtual DCS controllers 212), or the data historian application 224 may be configured to automatically monitor and store all available process data during operation of the physical process plant 100.

In some embodiments, the server group 210 may also perform load balancing between servers or other server devices in the server group 210 during operation of the process (block 412), as discussed above. To perform such load balancing, the server group 210 may simultaneously implement a plurality of instances of each of the software-defined process controllers (or control modules thereof) on different servers within the server group 210. Upon detecting a change to a status of one of the servers (e.g., failure of the server, addition of the server, jump in load at the server, or drop in load at the server), the server group 210 adjusts the load distribution between the plurality of servers within the server group 210 based upon the detected change in order to maintain efficient control of the process by the software-defined process controllers. Such adjustment to the load distribution may include shifting control of a part of the process from an instance of a virtual DCS controller 212 operating on a first server to another instance of the virtual DCS controller 212 operating on a second server, for example. In some such embodiments, a new instance of the virtual DCS controller 212 may also be initiated on a third server of the server group 210 to maintain redundancy to protect against subsequent failure of the second server.

In further embodiments, the server group 210 may receive an indication of a modification to the network architecture of the field environment 102 (block 414) and modify the software-defined DCS network architecture to reflect such modification (block 416). Similar to initial configuration of the software-defined DCS network architecture, the indication of the modification to the network architecture may be received from an operator via a virtual architecture configuration application 225, or the indication of the modification may be automatically generated based upon detecting a change in type of process data received as data traffic at the I/O connections 240. For example, a user may indicate via user input a replacement of one or more of the field devices 125-132, 140-150 with new field devices, or such replacement may be detected based upon a change in the data traffic received from the new field devices. In response to such indication of a modification to the physical network architecture in the field environment 102, the virtual architecture configuration application 225 adjusts the software-defined DCS network architecture to represent the modified physical network architecture. Such adjustment may include adding, removing, or modifying nodes or connections within the software-defined DCS network architecture. Such modifications to the software-defined DCS network architecture are then stored in the databases or datastores 230 of the server group 210 for use by the software-defined process controllers and DCS applications. In some embodiments, an adjustment to one or more of the software-defined process controllers may also be determined based upon the adjustment to the software-defined DCS network architecture. For example, a control loop within a software-defined process controller may be adjusted based upon an addition, replacement, or removal of a field device within the field environment 102 that changes the process data that is available for process control.

The software-defined DCS configuration and control method 400 may continue performing process control as described above until the controlled process within the physical process plant 100 is determined no longer to be ongoing (block 418). When the process terminates, the software-defined DCS configuration and control method 400 may also end.

Other Considerations

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., a server, an operator workstation, a controller, a control manager, a user computing device, etc.), cause the processors to execute the method. Where instructions, routines, modules, processes, services, programs, and/or applications are referred to herein as stored or saved on a computer readable memory or on a computer readable medium, the words "stored" and "saved" exclude transitory signals.

Further, while the terms "operator," "personnel," "person," "user," "technician," "engineer," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance, unless expressly or implicitly limited by the context of the description. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, controllers, services, or engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A process control system for controlling an industrial process within a physical process environment, the process control system comprising:
　a server group comprising a plurality of server devices configured to implement a software-defined distributed control system (DCS) environment by executing computer-readable instructions by one or more processors of each of the server devices, the software-defined DCS environment comprising:
　　one or more software-defined virtual process controllers executing in respective virtual machines on the server group, the software-defined virtual process controllers configured to control at least a portion of the industrial process in real time by communication with a plurality of virtual nodes within the software-defined DCS environment representing a plurality of physical field devices within the physical process environment;
　　an input/output (I/O) server configured to communicatively couple the plurality of virtual nodes with respective ones of the plurality of physical field devices within the physical process environment by mapping each virtual node of the plurality of virtual nodes to a physical I/O connection of a physical I/O server connecting the I/O server to a corresponding physical field device of the plurality of physical field devices and by routing real-time communication signals between the plurality of virtual nodes and the plurality of physical field devices via the respective physical I/O connections; and
　　one or more DCS applications configured to interact with the software-defined virtual process controllers, wherein at least one of the DCS applications is configured to adjust operation of the software-defined virtual process controllers; and
　one or more connection components comprising one or more ports, switches, or routers configured to (i) connect to at least one of the physical I/O connections of the I/O server to send and receive the real-time communication signals using a general purpose computer communication protocol used for communication between the server devices of the server group, (ii) convert the real-time communication signals between the general purpose computer communication protocol and an industrial process control communication protocol used for communication via a process control network within the physical process environment by the plurality of physical field devices, and (iii) connect to at least one corresponding physical field device over the process control network to send and receive the real-time communication signals using the industrial process control communication protocol.

2. The process control system of claim 1, wherein the software-defined DCS environment further comprises one or more virtual networking components configured to replicate one or more of the following physical network components: network switches, routers, or firewalls.

3. The process control system of claim 1, wherein the one or more DCS applications include a virtual architecture configuration application having a user interface configured to enable a user to define a virtual DCS network architecture by specifying the plurality of virtual nodes within the virtual DCS network architecture and logical connections between the virtual nodes and the plurality of field devices.

4. The process control system of claim 1, wherein the one or more DCS applications include a data historian application configured to store process data within the software-defined DCS environment automatically during operation of the industrial process.

5. The process control system of claim 1, wherein the one or more DCS applications include one or more of the following functionalities: an operator interface, an engineering workstation, or an asset management system.

6. The process control system of claim 1, wherein the one or more DCS applications include one or more of the following functionalities: a manufacturing executing system or an advanced process control system.

7. The process control system of claim 1, wherein the one or more DCS applications include a network gateway to communicate with external data networks.

8. The process control system of claim 1, wherein the one or more software-defined virtual process controllers include a plurality of instances of each of the one or more software-defined virtual process controllers running simultaneously on different server devices of the server group.

9. The process control system of claim 8, wherein the server group is configured to perform automatic load balancing between the plurality of instances of the software-defined virtual process controllers based upon statuses of the plurality of server devices in the server group.

10. The process control system of claim 1, wherein the one or more DCS applications include an application configured to predict an optimal number of server devices of the server group based upon resource usage of the server group and resource availability of the plurality of server devices.

11. The process control system of claim 1, wherein the I/O server is configured to:
receive, via the physical I/O connections, process data from the plurality of physical field devices;
route the process data to the plurality of virtual nodes such that the one or more software-defined virtual process controllers receive the process data;
receive process control signals for the plurality of virtual nodes from the one or more software-defined virtual process controllers; and
route, via the physical I/O connections, the process control signals to the plurality of physical field devices such that the one or more software-defined virtual process controllers control the portion of the industrial process.

12. A non-transitory computer-readable medium storing executable instructions for controlling an industrial process within a physical process environment that, when executed by processors of a plurality of server devices in a server group, cause the server group to implement a software-defined distributed control system (DCS) environment, the software-defined DCS environment comprising:
one or more software-defined virtual process controllers executing in respective virtual machines on the server group, the software-defined virtual process controllers configured to control at least a portion of the industrial process in real time by communication with a plurality of virtual nodes within the software-defined DCS environment representing a plurality of physical field devices within the physical process environment;
an input/output (I/O) server configured to communicatively couple the plurality of virtual nodes with respective ones of the plurality of physical field devices within the physical process environment by mapping each virtual node of the plurality of virtual nodes to a physical I/O connection of a physical I/O server connecting the I/O server to a corresponding physical field device of the plurality of physical field devices and by routing real-time communication signals between the plurality of virtual nodes and the plurality of physical field devices via the respective physical I/O connections, wherein the I/O server is configured to communicate with the plurality of field devices via one or more connection components comprising one or more ports, switches, or routers configured to (i) connect to at least one of the physical I/O connections of the I/O server to send and receive the real-time communication signals using a general purpose computer communication protocol used for communication between the server devices of the server group, (ii) convert the real-time communication signals between the general purpose computer communication protocol and an industrial process control communication protocol used for communication via a process control network within the physical process environment by the plurality of physical field devices, and (iii) connect to at least one corresponding physical field device over the process control network to send and receive the real-time communication signals using the industrial process control communication protocol; and
one or more DCS applications configured to interact with the software-defined virtual process controllers, wherein at least one of the DCS applications is configured to adjust operation of the software-defined virtual process controllers.

13. The non-transitory computer-readable medium of claim 12, wherein the software-defined DCS environment further comprises one or more virtual networking components configured to replicate one or more of the following physical network components: network switches, routers, or firewalls.

14. The non-transitory computer-readable medium of claim 12, wherein the one or more DCS applications include a virtual architecture configuration application having a user interface configured to enable a user to define a virtual DCS network architecture by specifying the plurality of virtual nodes within the virtual DCS network architecture and connections between the virtual nodes and the plurality of field devices.

15. The non-transitory computer-readable medium of claim 12, wherein the one or more DCS applications include a data historian application configured to store process data within the software-defined DCS environment automatically during operation of the industrial process.

16. The non-transitory computer-readable medium of claim 12, wherein the executable instructions, when executed by the processors of the plurality of server devices in the server group, cause the plurality of server devices of the server group to implement a plurality of instances of each of the one or more software-defined virtual process controllers, the plurality of instances running simultaneously on different server devices of the server group.

17. The non-transitory computer-readable medium of claim 16, wherein the executable instructions, when executed by the processors of the plurality of server devices in the server group, cause the server group to perform automatic load balancing between the plurality of instances of the software-defined virtual process controllers based upon statuses of the plurality of server devices in the server group.

18. A method for controlling an industrial process within a physical process environment, the method comprising:
connecting, via one or more input/output (I/O) connections of a physical I/O server, a plurality of physical field devices within the physical process environment to a server group comprising a plurality of server devices configured to implement a software-defined distributed control system (DCS) environment, wherein the field devices are connected to the physical I/O server via one or more connection components comprising one or more ports, switches, or routers configured to (i) connect to at least one of the physical I/O connections of the I/O server to send and receive real-time communication signals using a general purpose computer communication protocol used for communication between the server devices of the server group, (ii) convert the real-time communication signals between the general purpose computer communication protocol and an industrial process control communication protocol used for communication via a process control network within the physical process environment by the plurality of physical field devices, and (iii) connect to at least one corresponding physical field device over the process control network to send and receive the real-time communication signals using the industrial process control communication protocol;

communicatively coupling, with an I/O server running on the server group, the plurality of physical field devices to virtual nodes within the software-defined DCS environment by mapping each virtual node of the plurality of virtual nodes to a corresponding I/O connection of the one or more I/O connections that connects the I/O server to a corresponding physical field device of the plurality of physical field devices and by routing the real-time communication signals between the plurality of virtual nodes and the plurality of physical field devices via the one or more I/O connections;

controlling, by one or more software-defined virtual process controllers running in respective virtual machines in the software-defined DCS environment on the server group, at least a portion of the industrial process in real time by communication with the plurality virtual nodes within the software-defined DCS environment; and adjusting, by one or more DCS applications running in the software-defined DCS environment on the server group and configured to interact with the software-defined virtual process controllers, operation of the one or more software-defined virtual process controllers.

19. The method of claim 18, further comprising:

receiving, at the I/O server via the one or more I/O connections, process data from the plurality of physical field devices;

routing, with the I/O server, the process data to the plurality of virtual nodes;

receiving, at the I/O server, process control signals for the plurality of virtual nodes; and routing, with the I/O server, the process control signals to the plurality of physical field devices to control the portion of the industrial process.

20. The method of claim 18, wherein the one or more DCS applications include a virtual architecture configuration application, and further comprising:

generating, by the virtual architecture configuration application, a user interface for a user, wherein the user interface includes a plurality of options to configure virtual components within the software-defined DCS environment; and receiving, at the one or more DCS applications, user input from the user to define a virtual DCS network architecture by specifying the plurality of virtual nodes within the virtual DCS network architecture and connections between the virtual nodes and the plurality of field devices.

21. The method of claim 18, further comprising:

monitoring, by a data historian application running in the software-defined DCS environment on the server group, process data within the software-defined DCS environment automatically during operation of the industrial process; and automatically storing, in a datastore associated with the server group, the process data monitored by the data historian application.

22. The method of claim 18, further comprising:

detecting, by the one or more DCS applications, a type of process data associated with a field device of the plurality of field devices based upon data traffic at the one or more I/O connections; and determining, by the one or more DCS applications, an adjustment to the operation of the one or more software-defined virtual process controllers based upon the type of the process data.

23. The method of claim 18, wherein the one or more software-defined virtual process controllers include a plurality of instances of each of the one or more software-defined virtual process controllers running simultaneously on different server devices of the server group, and further comprising:

detecting, by the one or more DCS applications, a change to a status of one of the plurality of server devices of the server group; and adjusting, by the one or more DCS applications, a load distribution between the plurality of server devices based upon the change to the status.

\* \* \* \* \*